(12) United States Patent
Ouyang et al.

(10) Patent No.: US 8,731,360 B2
(45) Date of Patent: May 20, 2014

(54) PHOTONIC CRYSTAL MAGNETO-OPTICAL CIRCULATOR AND MANUFACTURING METHOD THEREOF

(75) Inventors: Zhengbiao Ouyang, Guangdong (CN); Qiong Wang, Guangdong (CN)

(73) Assignee: Shenzhen University, Shenzhen (CN)

(*) Notice: Subject to any disclaimer, the term of this patent is extended or adjusted under 35 U.S.C. 154(b) by 0 days.

(21) Appl. No.: 13/504,559

(22) PCT Filed: Nov. 29, 2010

(86) PCT No.: PCT/CN2010/079238
§ 371 (c)(1),
(2), (4) Date: Apr. 27, 2012

(87) PCT Pub. No.: WO2012/062005
PCT Pub. Date: May 18, 2012

(65) Prior Publication Data
US 2013/0223805 A1    Aug. 29, 2013

(30) Foreign Application Priority Data
Nov. 12, 2010    (CN) .......................... 2010 1 0542656

(51) Int. Cl.
| G02B 6/10 | (2006.01) |
| G02F 1/00 | (2006.01) |
| H01S 5/00 | (2006.01) |
| H01S 3/08 | (2006.01) |
| G02B 6/12 | (2006.01) |
| G02B 6/036 | (2006.01) |
| G02B 6/02 | (2006.01) |

(52) U.S. Cl.
CPC G02B 6/10 (2013.01); G02B 6/036 (2013.01); G02B 6/02 (2013.01)
USPC .............................. 385/130; 359/321; 372/96

(58) Field of Classification Search
USPC .......... 385/14–24, 129–131; 359/321; 372/96
See application file for complete search history.

(56) References Cited

U.S. PATENT DOCUMENTS

| 4,274,710 A | 6/1981 | Nagao | |
| 6,937,781 B2 * | 8/2005 | Shirane et al. | 385/16 |
| 7,136,561 B2 * | 11/2006 | Enokido | 385/129 |

(Continued)

FOREIGN PATENT DOCUMENTS

| CN | 2924804 Y | 7/2007 |
| CN | 101726873 A | 6/2010 |

(Continued)

*Primary Examiner* — Akm Enayet Ullah
(74) *Attorney, Agent, or Firm* — Jackson IPG PLLC (57) ABSTRACT

The invention relates to a photonic crystal magneto-optical circulator, which comprises first dielectric material columns in an air background, wherein the first dielectric material columns are arranged in the form of two-dimensional square lattice. The photonic crystal magneto-optical circulator also comprises a "T-shaped" or a "cross-shaped" photonic crystal waveguide, a second dielectric material column, four same magneto-optical material columns and at least three same third dielectric material columns, wherein the "T-shaped" or a "cross-shaped" photonic crystal waveguide comprises a horizontal photonic crystal waveguide and a vertical photonic crystal waveguide which are intercrossed; the second dielectric material column is arranged at a cross-connected position of the horizontal photonic crystal waveguide and the vertical photonic crystal waveguide and has the function of light guiding; the four same magneto-optical material columns are uniformly arranged on the periphery of the second dielectric material column; and at least three same third dielectric material columns.

16 Claims, 8 Drawing Sheets

(56) References Cited

U.S. PATENT DOCUMENTS

| | | | |
|---|---|---|---|
| 7,477,819 B2 * | 1/2009 | Enokido et al. | 385/123 |
| 7,489,846 B2 * | 2/2009 | Grot et al. | 385/123 |
| 7,664,158 B2 * | 2/2010 | Kiyota | 372/96 |
| 8,548,283 B2 * | 10/2013 | Kilic et al. | 385/12 |
| 2002/0146196 A1 * | 10/2002 | Shirane et al. | 385/16 |
| 2005/0200942 A1 * | 9/2005 | Grot et al. | 359/321 |
| 2006/0024011 A1 * | 2/2006 | Enokido | 385/129 |
| 2010/0158430 A1 | 6/2010 | Nakada et al. | |

FOREIGN PATENT DOCUMENTS

| | | |
|---|---|---|
| CN | 101788727 A | 7/2010 |
| CN | 101788728 A | 7/2010 |
| JP | 05-061002 | 3/1993 |

* cited by examiner

PHOTONIC CRYSTAL MAGNETO-OPTICAL CIRCULATOR AND MANUFACTURING METHOD THEREOF

FIELD OF THE INVENTION

The invention belongs to the technical field of photonic crystal integrated devices and relates to a "T-shaped" three-port or "cross-shaped" four-port two-dimensional photonic crystal magneto-optical circulator and a manufacturing method thereof.

BACKGROUND OF THE INVENTION

Magneto-optical circulator is a key device for reducing the optical signal crosstalk and improving the component integration in integrated optics. The magneto-optical circulator can realize circular transmission of optical signals in single rotational direction among channels by utilizing the non-reciprocal characteristic of magneto-optical materials, so as to achieve the aims of preventing the signal reflection, eliminating the signal crosstalk and guaranteeing the normal operation of an optical circuit system, thereby being an indispensable performance-optimization component in an integrated optical system.

Currently, the use of photonic crystal all-optical logic elements to obtain a complex optical circuit with different functions is a popular study. For example, the use of "AND", "OR," "NOT", "XOR" and other photonic crystal basic logic functional elements to construct photonic crystal half adders, photonic crystal comparators, and photonic crystal A/D (D/A) converters. The research of photonic crystal logic integrated optical circuits has potential application value to the development of a new generation of optical integrated chips. However, with the increase of the integration scale in the photonic crystal integrated optical circuits, the optical signal interference among components is greatly increased and the optical circuits even cannot realize their normal logic functions under severe cases. Therefore, the development of corresponding magneto-optical circulators has become a key technical problem to be solved for improving the stability of signal transmission inside photonic crystal integrated optical circuits and guaranteeing the normal operation of the optical circuit system.

By now, the available photonic crystal logic elements are basically realized in an air-substrate-dielectric-column structure (square lattice arrangement), while the several available photonic crystal circulators are basically realized in a dielectric-substrate-air-column structure (hexagonal lattice arrangement), [the TE band gap of the air-substrate-dielectric-column structure is deeper, compared with that of the dielectric-substrate-air-column structure, (the advantages of deeper band gap are that the required dimension of a photonic crystal is smaller under the same performance index, so that the integration scale can be easily improved), so that the air-substrate-dielectric-column structure has the advantages of avoiding the interference of TM mode, having excellent working characteristics and simple structural form, and being easy to design and produce], so that the application scope thereof has certain limitation. Therefore, as for the research of photonic crystal magneto-optical circulators and particularly the research of photonic crystal magneto-optical circulators with the air-substrate-dielectric-column structure (square lattice arrangement) which are matched with the available photonic crystal logic elements, further development is required in the aspects of structure type, functional application and so on.

The photonic crystal magneto-optical circulator has important application value for the large-scale integration of the photonic crystal logic elements, is helpful to eliminate the effects of signal crosstalk and light beam reflection, is favorable to promote the functional match of various components in an optical circuit, and is an indispensable anti-interference component in the integrated optical system.

SUMMARY OF THE INVENTION

The technical problem to be solved of the invention is to utilize the optical activity of magneto-optical materials to design a "T-shaped" three-port or "cross-shaped" four-port photonic crystal magneto-optical circulator and a manufacturing method thereof to realize circular light transmission in single rotational direction among three ports or four ports, respectively.

The technical proposal adopted to solve the technical problem of the invention is as follows: the invention relates to a photonic crystal magneto-optical circulator, which comprises first dielectric material columns in an air background, wherein the first dielectric material columns in the photonic crystal are arranged in the form of two-dimensional square lattices; each first dielectric material column occupies one lattice in the photonic crystal; and the center-to-center distance between any two adjacent horizontal or vertical first dielectric material columns is one lattice constant. The photonic crystal magneto-optical circulator also comprises a "T-shaped" or a "cross-shaped" photonic crystal waveguide, a second dielectric material column, four same magneto-optical material columns and at least three same third dielectric material columns, wherein the "T-shaped" or a "cross-shaped" photonic crystal waveguide comprises a horizontal photonic crystal waveguide and a vertical photonic crystal waveguide which are mutually cross-connected; the second dielectric material column is arranged at the cross-connected position of the horizontal photonic crystal waveguide and the vertical photonic crystal waveguide and has the function of light guiding; the four same magneto-optical material columns are uniformly arranged on the periphery of the second dielectric material column; the third dielectric material columns are respectively arranged on the outsides of three magneto-optical material columns.

As a further improvement of the invention, the horizontal photonic crystal waveguide and the vertical photonic crystal waveguide which are mutually cross-connected are combined into a "T-shaped" photonic crystal waveguide which comprises three ports, wherein a third dielectric material column arranged on the outside of one magneto-optical material column is arranged along the axis of each port respectively, and an air-point-defect cavity is arranged on the outside of a fourth magneto-optical material column.

As a further improvement of the invention, the horizontal photonic crystal waveguide and the vertical photonic crystal waveguide which are mutually cross-connected are combined into the "cross-shaped" photonic crystal waveguide which comprises four ports, wherein a third dielectric material column arranged on the outside of one magneto-optical material column is arranged in the direction of each port, respectively.

The first dielectric material columns, the second dielectric material column and the third dielectric material columns are all made of silicon materials which have a refractive index of 3.4; and the first dielectric material columns, the second dielectric material column and the third dielectric material columns are different in radius.

As a further improvement of the invention, the horizontal photonic crystal waveguide and the vertical photonic crystal waveguide are respectively formed by removing a row of first dielectric material columns and a column of first dielectric material columns from the photonic crystal, wherein the length of the horizontal photonic crystal waveguide of the "T-shaped" photonic crystal waveguide is na while the length of the vertical photonic crystal waveguide of the "T-shaped" photonic crystal waveguide is (n−1)a/2, and the lengths of both the horizontal photonic crystal waveguide and the vertical photonic crystal waveguide of the "cross-shaped" photonic crystal waveguide are na, wherein "a" represents the lattice constant of the photonic crystal and "n" is an odd integer which is more than or equal to 9.

Preferably, "n" is 9, 11, 13 or 15.

As a further improvement of the invention, the four magneto-optical material columns are distributed at four lattices most adjscent to the second dielectric material column, and the center-to-center distance betwen each magneto-optical material column and the second dielectric material column is one lattice constant.

As a further improvement of the invention, the air-defect point cavity is formed by removing a first dielectric material column at a secondly adjacent lattice above the second dielectric material column.

As a further improvement of the invention, the three third dielectric material columns are distributed at three secondly adjacent lattices on the left, the lower side and the right of the second dielectric material column, and the center-to-center distance between each third dielectric material column and the second dielectric material column is two lattice constants.

As a further improvement of the invention, the four third dielectric material columns are distributed at the four lattices around the second dielectric material column, and the center-to-center distance between each third dielectric material column and the second dielectric material column is two lattice constant.

The invention also provides a method for manufacturing the photonic crystal magneto-optical circulator, wherein the manufacturing method comprises the following steps:

Step one: the operating wavelength λ of the photonic crystal magneto-optical circulator is given; two-dimensional first dielectric material columns arranged in the form of square lattices are selected to form a photonic crystal; and the radius of the first dielectric material columns is selected to guarantee that the operating wavelength is within the forbidden band range of the photonic crystal. For example, the ratio of the radius of the first dielectric material column to the operating wavelength is $r_1/\lambda=0.07$.

Step two: a horizontal photonic crystal waveguide and a vertical photonic crystal waveguide are respectively formed by removing a row of first dielectric material columns and a column of first dielectric material columns from the photonic crystal and are in a cross-connected arrangement to form a "T-shaped" or a "cross-shaped" photonic crystal waveguide; a second dielectric material column is introduced at the cross-connected position of the horizontal photonic crystal waveguide and the vertical photonic crystal waveguide to form a light guiding column; same magneto-optical material columns are respectively introduced into the four most adjacent lattices on the left side, the lower side and the right side of the second dielectric material column; and a most adjacent first dielectric material column above the second dielectric material column is removed and a magneto-optical material column which is the same with three magneto-optical material columns is introduced thereon.

As a further improvement of the manufacturing method of the invention, the manufacturing method further comprises step three: an air-point-defect cavity is formed by removing a first dielectric material column at a secondly adjacent lattice above the second dielectric material column.

As a further improvement of the manufacturing method of the invention, the manufacturing method also comprises the following step: same third dielectric material columns are respectively introduced into three secondly adjacent lattices on the left side, the lower side and the right side of the second dielectric material column.

As a further improvement of the manufacturing method of the invention, the manufacturing method also comprises the following step: same third dielectric material columns are respectively introduced into four secondly adjacent lattices on the left, the lower side, the right and the upper side of the second dielectric material column.

As a further improvement of the manufacturing method of the invention, the ratio of the radius of the first dielectric material columns to the operating wavelength is $r_1/\lambda=0.07$.

As a further improvement of the manufacturing method of the invention, the work efficiency of the magneto-optical circulator under the operating wavelength λ is adjusted by changing the radius $r_2$ of the second dielectric material column, the radius $r_m$ of the magneto-optical material columns and the radius $r_3$ of the third dielectric material columns; and the dimension parameters under the work efficiency are as follows: the ratios of the radius of the second dielectric material column, the radius of the magneto-optical material columns and the radius of the third dielectric material columns to the operating wavelength are $r_2/\lambda=0.125$, $r_m/\lambda=0.09$ and $r_3/\lambda=0.02$, respectively.

The invention has the advantages that: firstly, the photonic crystal magneto-optical circulator with the air-substrate-dielectric-column structure (square lattice arrangement) can be effectively matched and integrated with the currently widely investigated photonic crystal logic elements; secondly, the three-port or four-port photonic crystal magneto-optical circulator having simple form and compact structure is obtained by utilizing the structural coupling among the magneto-optical material columns, so as to fully providing circulators with different functions and structures for the optimization of photonic crystal optical logic integrated circuits.

BRIEF DESCRIPTION OF THE DRAWINGS

Further description will be given with the attached drawings and embodiments.

DETAILED DESCRIPTION OF THE PREFERRED EMBODIMENTS

The invention is to apply the optical activity of magneto-optical materials to a photonic crystal to design a "T-shaped" three-port or "cross-shaped" four-port photonic crystal magneto-optical circulator having simple form and compact structure to realize circular light transmission in single rotational direction among three ports or four ports, respectively.

Figure 1:
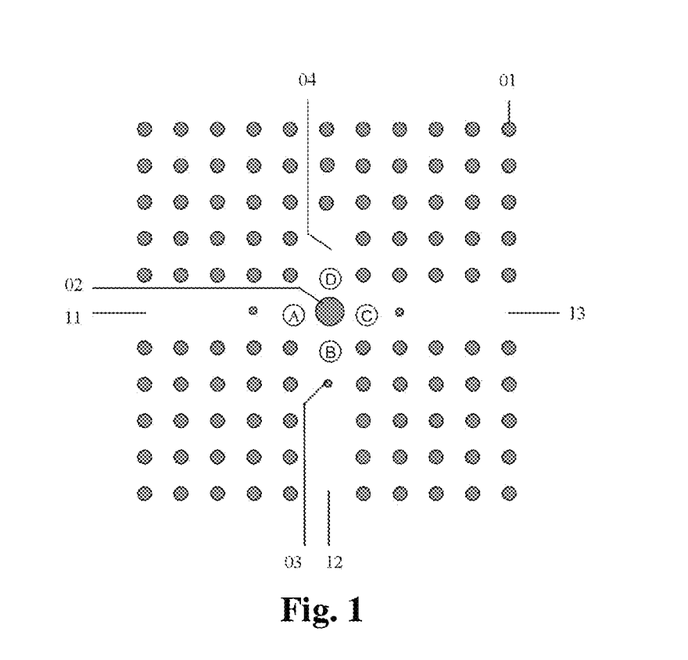
FIG. 1 is a structural diagram of the "T-shaped" photonic crystal magneto-optical circulator provided by the invention, wherein third dielectric material columns are respectively introduced into three secondly adjacent lattices on the left side, the lower side and the right side of a second dielectric material column.

FIG. 1 illustrates the structure model of the "T-shaped" three-port photonic crystal magneto-optical circulator. The photonic crystal is formed by two-dimensional first dielectric material columns in an air background and comprises a "T-shaped" photonic crystal waveguide and also comprises a second dielectric material column which is arranged at a cross-connected position at the "T-shaped" photonic crystal waveguide and has the function of light guiding, four same magneto-optical material columns adjacent to the second dielectric material column, an air-point-defect cavity and three same third dielectric material columns.

Figure 2:
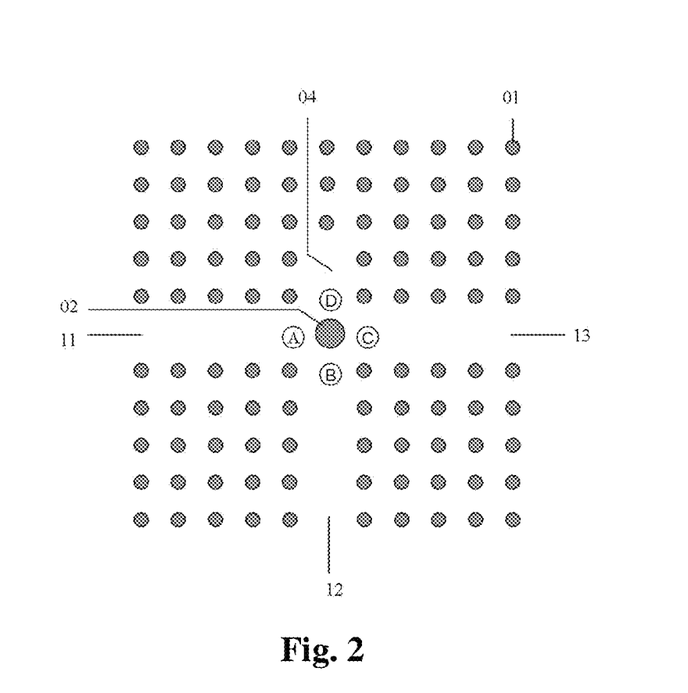
FIG. 2 is a structural diagram of the "T-shaped" photonic crystal magneto-optical circulator provided by the invention, wherein the third dielectric material columns are not introduced into the three secondly adjacent lattices on the left, the lower side and the right of the second dielectric material column.

The third dielectric material columns can be introduced or not introduced into the "T-shaped" three-port photonic crystal magneto-optical circulator. FIG. 2 illustrates the structure model of the "T-shaped" three-port photonic crystal magneto-optical circulator in which the third dielectric material columns are not introduced. The preferred proposal of the "T-shaped" three-port photonic crystal magneto-optical circulator is for the third dielectric material columns introduced.

The following embodiments are the one in which the third dielectric material columns are introduced.

As shown in the following specifically, the photonic crystal is formed by first dielectric material columns 01 in an air background which are arranged in the form of two-dimensional square lattices (11×11 lattice array); each first dielectric material column 01 occupies one lattice of the lattice array; the center-to-center distance of any two adjacent horizontal or vertical first dielectric material columns 01 is one lattice constant; lattices at row m and column n in the lattice array are marked as (m, n), 11.25 mm is selected as the lattice constant "a" of the photonic crystal; the radius of the first dielectric material columns 01 is $r_1$=2.1 mm, and silicon material is selected as the material for the first dielectric material columns, and the refractive index of the material is 3.4. Moreover, a horizontal photonic crystal waveguide is formed by removing first dielectric material columns 01 at lattices (6, 1), (6, 2), (6, 3), (6, 4), (6, 5), (6, 6), (6, 7), (6, 8), (6, 9), (6, 10) and (6, 11) from the photonic crystal, and a vertical photonic crystal waveguide is formed by removing first dielectric material columns 01 at lattices (7, 6), (8, 6), (9, 6), (10, 6) and (11, 6) from the photonic crystal. The horizontal photonic crystal waveguide and the vertical photonic crystal waveguide are in a "T-shaped" arrangement to form a "T-shaped" photonic crystal waveguide.

A second dielectric material column 02 is introduced as a light guiding column into lattice (6, 6) in the photonic crystal, namely into the cross-connected position of the horizontal photonic crystal waveguide and the vertical photonic crystal waveguide in the "T-shaped" photonic crystal waveguide. Silicon material is selected as the material for the second dielectric material column 02, and the refractive index of the material is 3.4. Same magneto-optical material columns A, B and C are respectively introduced into the three lattices (6, 5), (7, 6) and (6, 7) in the photonic crystal, namely into most adjacent lattices on the left side, the lower side and the right side of the second dielectric material column 02. A first dielectric material column 01 is removed from the lattice (5, 6) in the photonic crystal, namely from the most adjacent lattice above the second dielectric material column 02, and a magneto-optical material column D which is the same as the magneto-optical material columns introduced thereon. Ferrite material is selected as the material for the magneto-optical material columns A, B, and C, wherein the dielectric constant of the material is 12.9 and the permeability tensor of the material is $$[\mu] = \begin{bmatrix} \mu & jk & 0 \\ jk & \mu & 0 \\ 0 & 0 & \mu_0 \end{bmatrix},$$

Wherein k=−8.48, µ=−7. And the external magnetic field applied to the four magneto-optical material columns is along the axis of the magneto-optical material columns.

An air-point-defect cavity 04 is formed by removing a first dielectric material column 01 from lattice (4, 6) in the photonic crystal, namely from a secondly adjacent lattice above the second dielectric material column 02.

Same third dielectric material columns 03 are respectively introduced into the three lattices (6, 4), (8, 6) and (6, 8) in the photonic crystal, namely into secondly adjacent lattices on the left side, the lower side and the right side of the second dielectric material column 02. Silicon material is selected as the material for the third dielectric material columns 03, and the refractive index of the material is 3.4.

The "T-shaped" photonic crystal magneto-optical circulator comprises three ports, namely the first port 11, the second port 12 and the third port 13.

Figure 3:
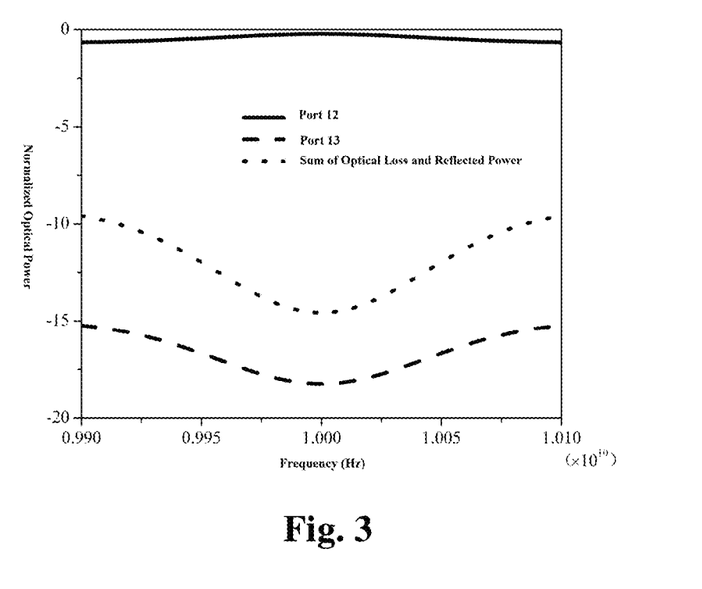
FIG. 3 is a spectrogram of the "T-shaped" photonic crystal magneto-optical circulator provided by the invention, wherein a port 11 is a light input port; the solid line represents the ratio of the light power at the port 12 to that at the port 11; the dashed line represents the ratio of the light power at the port 13 to that at the port 11; and the dot line represents the ratio of the sum of optical loss and reflected light power to the incident light power at the port 11.

Furthermore, the structure parameters of the "T-shaped" photonic crystal magneto-optical circulator are optimized: light is incident from the first port 11; light detectors are respectively arranged on the second port 12 and the third port 13 to obtain the light power transmitted to the corresponding ports; and a light detector is arranged on the first port 11 to obtain the light power reflected at the port. Moreover, the spectrogram of the "T-shaped" photonic crystal magneto-optical circulator under the optimum work efficiency, obtained by optimizing the radii of the second dielectric material column 02, the magneto-optical material columns and the third dielectric material columns 03, is illustrated in FIG. 3. In the FIG. 3, the solid line and the dashed line respectively represent the ratio of the light power at the second port 12 to that at the first port 11 and the ratio of the light power at the third port 13 to that at the first port 11 at different frequencies, and the dot line represents the ratio of the sum of optical loss and reflected light power to the power of the incident light at the first port 11. As illustrated in FIG. 3, the optimum work efficiency of the "T-shaped" photonic crystal magneto-optical circulator is 10 GHz (operating wavelength λ=30 mm), the ratio of the light power at the second port 12 to that at the first port 11 is −0.223 dB, the ratio of the light power at the third port 13 to that at the first port 11 is −18.2 dB; and the ratio of the sum of optical loss and reflected light power to the power of the incident light at the first port 11 is −14.6 dB. Accordingly, the optimized radius $r_2$ of the second dielectric material column 02, the optimized radius $r_m$ of the magneto-optical material columns, and the optimized radius $r_3$ of the third dielectric material columns 03 are $r_2/\lambda$=0.125, $r_m/\lambda$=0.09 and $r_3/\lambda$=0.02, respectively.

Figure 4:
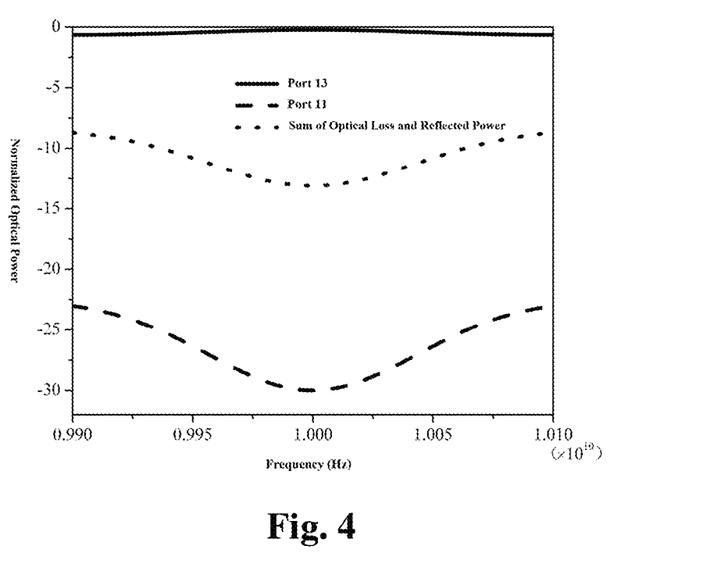
FIG. 4 is a spectrogram of the "T-shaped" photonic crystal magneto-optical circulator provided by the invention, wherein the port 12 is a light input port; the solid line represents the ratio of the light power at the port 13 to that at the port 12; the dashed line represents the ratio of the light power at the port 11 to that at the port 12; and the dot line represents the ratio of the sum of optical loss and reflected light power to the incident light power at the port 12.

Light is incident from the second port 12; light detectors are respectively arranged on the third port 13 and the first port 11 to obtain the light power transmitted to the corresponding ports; and a light detector is arranged on the second port 12 to obtain the light power reflected back at the port. The spectrogram of the "T-shaped" photonic crystal magneto-optical circulator under the optimum work efficiency, obtained by optimizing the structure parameters of the second dielectric material column 02, the magneto-optical material columns and the third dielectric material columns 03, is illustrated in FIG. 4. In the FIG. 4, the solid line and the dashed line respectively represent the ratio of the light power at the third port 13 to that at the second port 12 and the ratio of the light power at the first port 11 to that at the second port 12 at different frequencies, and the dot line represents the ratio of the sum of optical loss and reflected light power to the power of the incident light at the second port 12. As illustrated in FIG. 4, the optimum work efficiency of the "T-shaped" photonic crystal magneto-optical circulator is 10 GHz; the ratio of the light power at the third port 13 to that at the second port 12 is −0.223 dB, the ratio of the light power at the first port 11 to that at the second port 12 is −30 dB; and the ratio of the sum of optical loss and reflected light power to the power of the incident light at the second port 12 is −13.1 dB.

Figure 5:
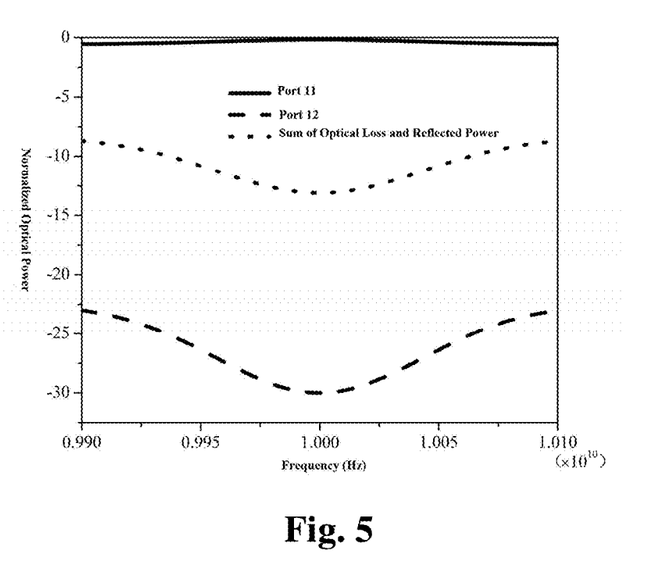
FIG. 5 is a spectrogram of the "T-shaped" photonic crystal magneto-optical circulator provided by the invention, wherein the port 13 is a light input port; the solid line represents the ratio of the light power at the port 11 to that at the port 13; the dashed line represents the ratio of the light power at the port 12 to that at the port 13; and the dot line represents the ratio of the sum of optical loss and reflected light power to the incident light power at the port 13.

Light is incident from the third port 13; light detectors are respectively arranged on the first port 11 and the second port 12 to obtain the light power transmitted to the corresponding ports; and a light detector is arranged on the third port 13 to obtain the light power reflected at the port. The spectrogram of the "T-shaped" photonic crystal magneto-optical circulator under the optimum work efficiency, obtained by optimizing the structure parameters of the second dielectric material column 02, the magneto-optical material columns and the third dielectric material columns 03, is illustrated in FIG. 5. In FIG. 5, the solid line and the dashed line respectively represent the ratio of the light power at the first port 11 to that at the third port 13 and the ratio of the light power at the second port 12 to that at the third port 13 at different frequencies, and the dot line represents the ratio of the sum of optical loss and reflected light power to the power of the incident light at the third port 13. As illustrated in FIG. 5, the optimum work efficiency of the "T-shaped" photonic crystal magneto-optical circulator is 10 GHz; the ratio of the light power at the first port 11 to that at the third port 13 is −0.177 dB, the ratio of the light power at the second port 12 to that at the third port 13 is −23.0 dB, and the ratio of the sum of optical loss and reflected light power to the power of the incident light at the third port 13 is −14.6 dB.

The working performances of the "T-shaped" photonic crystal magneto-optical circulator are checked according to the above optimized results.

Figure 6:
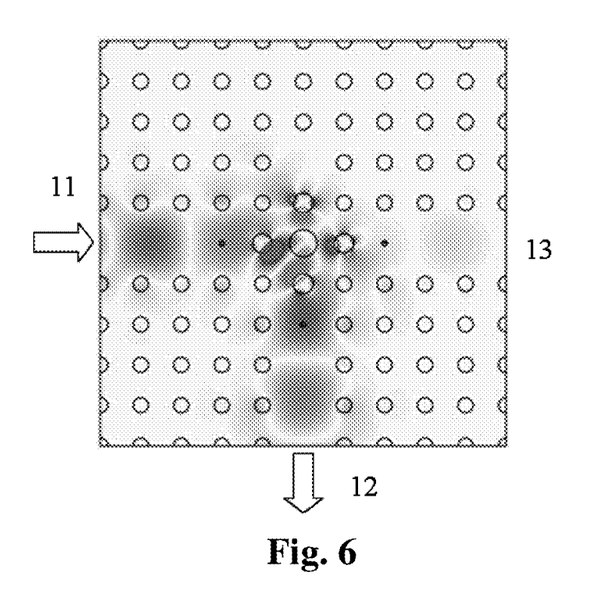
FIG. 6 is a light transmission diagram of the "T-shaped" photonic crystal magneto-optical circulator provided by the invention, wherein the port 11 is a light input port; the port 12 is a light output port; and the port 13 is a light isolating port.

As illustrated in FIG. 6, light with the frequency of 10 GHz is incident from the first port 11 and finally transmitted to the second port 12 after 90 DEG rotation; the ratio of the light power at the second port 12 to that at the first port 11 is −0.223 dB, the light is rotated by 45 DEG by each of the two magneto-optical material columns A and B at lattices (6, 5) and (7, 6) in the photonic crystal; the third port 13 is in the light isolation state, and the ratio of the light power at the third port 13 to that at the first port 11 is −18.2 dB; and accordingly, the ratio of the sum of optical loss and reflected light power to the power of the incident light at the first port 11 is −14.6 dB.

Figure 7:
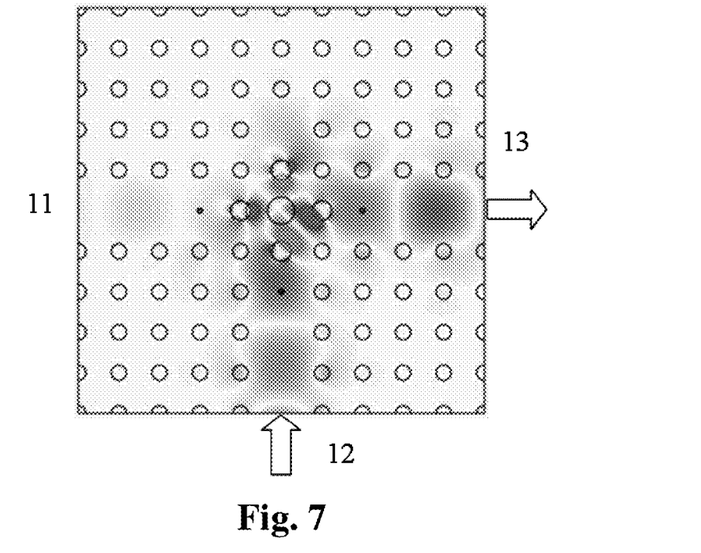
FIG. 7 is a light transmission diagram of the "T-shaped" photonic crystal magneto-optical circulator provided by the invention, wherein the port 12 is a light input port; the port 13 is a light output port; and the port 11 is a light isolating port.

As illustrated in FIG. 7, light with the frequency of 10 GHz is incident from the second port 12 and finally transmitted to the third port 13 after 90 DEG rotation; the ratio of the light power at the third port 13 to that at the second port 12 is −0.223 dB, the light is rotated by 45 DEG by each of the two magneto-optical material columns B and C at lattices (7, 6) and (6, 7) in the photonic crystal; the first port 11 is in the light isolation state, and the ratio of the light power at the first port 11 to that at the second port 12 is −30 dB; and accordingly, the ratio of the sum of optical loss and reflected light power to the power of the incident light at the second port 12 is −13.1 dB.

Figure 8:
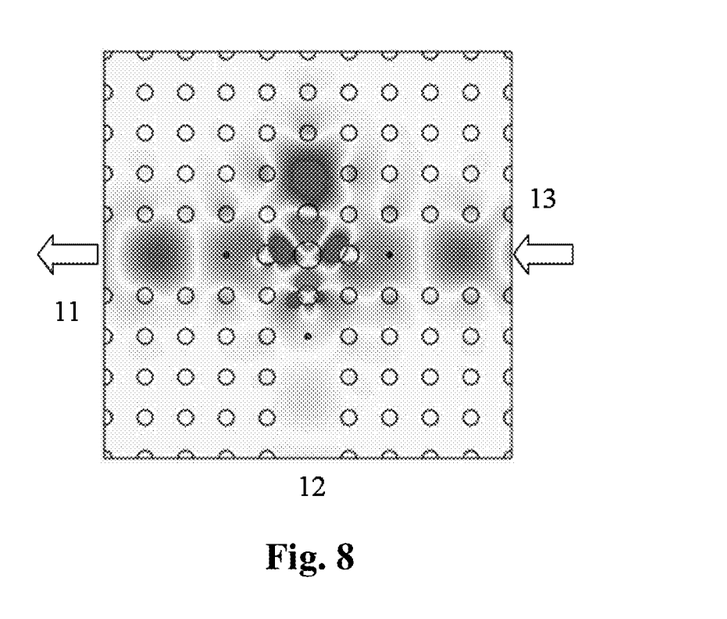
FIG. 8 is a light transmission diagram of the "T-shaped" photonic crystal magneto-optical circulator provided by the invention, wherein the port 13 is a light input port; the port 11 is a light output port; and the port 12 is a light isolating port.

As illustrated in FIG. 8, light with the frequency of 10 GHz is incident from the third port 13, uploaded to the air-point-defect cavity 04 of the photonic crystal by two magneto-optical material columns C and D at lattices (6, 7) and (5, 6) in the photonic crystal, downloaded from the air-point-defect cavity 04 of the photonic crystal by two magneto-optical material columns D and A at lattices (5, 6) and (6, 5) in the photonic crystal, and finally transmitted to the first port 11; the ratio of the light power at the first port 11 to that at the third port 13 is −0.177 dB, the second port 12 is in the light isolation state, and the ratio of the light power at the second port 12 to that at the third port 13 is −23.0 dB; and accordingly, the ratio of the sum of optical loss and reflected light power to the power of the incident light at the third port 13 is −14.6 dB.

The "T-shaped" photonic crystal magneto-optical circulator realizes circular light transmission in single rotational direction among three ports, namely light inputted from any port among the three ports can transmit to the next adjacent port circularly in the same rotational direction.

Figure 9:
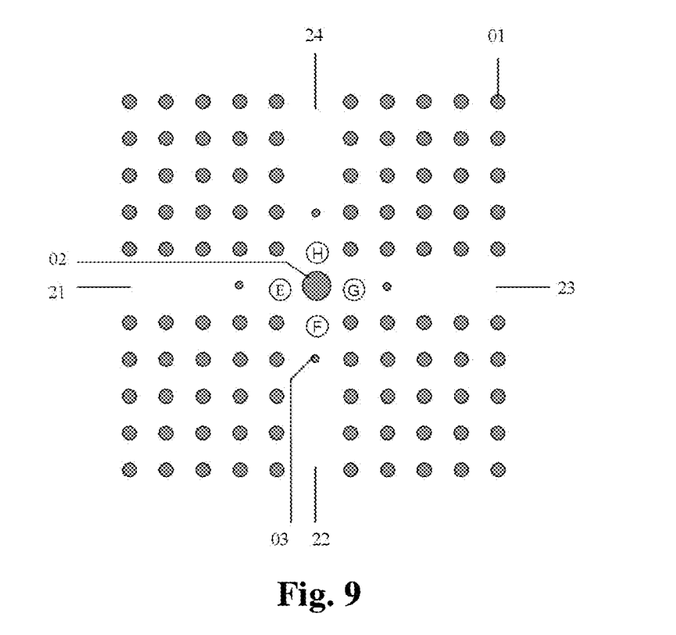
FIG. 9 is a structural diagram of the "cross-shaped" photonic crystal magneto-optical circulator provided by the invention, wherein same third dielectric material columns are respectively introduced into four lattices secondly adjacent to the second dielectric material column.

FIG. 9 illustrates the structure model of a "cross-shaped" four-port photonic crystal magneto-optical circulator. The photonic crystal is formed by two-dimensional first dielectric material columns in an air background and comprises a "cross-shaped" photonic crystal waveguide, a second dielectric material column which is arranged at the cross-connected position in the "cross-shaped" photonic crystal waveguide and has the function of light guiding, four same magneto-optical material columns adjacent to the second dielectric material column, and four same third dielectric material columns.

Figure 10:
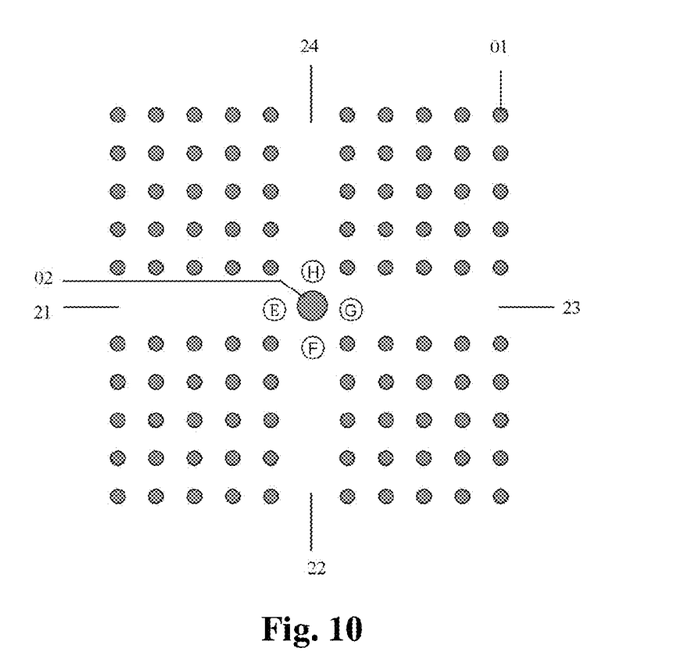
FIG. 10 is a structural diagram of the "cross-shaped" photonic crystal magneto-optical circulator provided by the invention, wherein the third dielectric material columns are not introduced into the four lattices secondly adjacent to the second dielectric material column.

The third dielectric material columns can be introduced or not introduced into the "cross-shaped" photonic crystal magneto-optical circulator. FIG. 10 illustrates the structure model of the "cross-shaped" photonic crystal magneto-optical circulator in which the third dielectric material columns are not introduced. The preferred proposal of the "cross-shaped" photonic crystal magneto-optical circulator is for the third dielectric material columns being introduced.

The following embodiments are the one in which the third dielectric material columns are introduced.

As shown in the following specifically, the photonic crystal is formed by first dielectric material columns 01 in the air background which are arranged in the form of two-dimensional square lattice (11×11 lattice array); each first dielectric material column 01 occupies one lattice of the lattice array; the center-to-center distance of any two adjacent horizontal or vertical first dielectric material columns 01 is one lattice constant; lattices at row m and column n in the lattice array are marked as (m, n), 11.25 mm is selected as the lattice constant of the photonic crystal; the radius of the first dielectric material columns 01 is $r_1$=2.1 mm; and silicon material is selected as the material for the first dielectric material columns, and the refractive index of the material is 3.4. Moreover, a horizontal photonic crystal waveguide is formed by removing first dielectric material columns 01 at lattices (6, 1), (6, 2), (6, 3), (6, 4), (6, 5), (6, 6), (6, 7), (6, 8), (6, 9), (6, 10) and (6, 11) from the photonic crystal, and a vertical photonic crystal waveguide is formed by removing first dielectric material columns 01 at lattices (1, 6), (2, 6), (3, 6), (4, 6), (5, 6), (7, 6), (8, 6), (9, 6), (10, 6) and (11, 6) from the photonic crystal. The horizontal photonic crystal waveguide and the vertical photonic crystal waveguide are in a "cross-shaped" arrangement to form a "cross-shaped" photonic crystal waveguide.

A second dielectric material column 02 is introduced as a light guiding column into lattice (6, 6) in the photonic crystal, namely into a cross-connected position of the horizontal photonic crystal waveguide and the vertical photonic crystal waveguide in the "cross-shaped" photonic crystal waveguide. Silicon material is selected as the material for the second dielectric material column 02, and the refractive index of the material is 3.4. Same magneto-optical material columns E, F, G and H are respectively introduced into four lattices (6, 5), (7, 6), (6, 7) and (5, 6) in the photonic crystal, namely into four lattices most adjacent to the second dielectric material column 02. Ferrite material is selected as the material for the magneto-optical material columns E, F, G and H, wherein the dielectric constant of the material is 12.9 and the permeability tensor of the material is $$[\mu] = \begin{bmatrix} \mu & jk & 0 \\ jk & \mu & 0 \\ 0 & 0 & \mu_0 \end{bmatrix},$$

Wherein k=−8.48, μ=−7. And the external magnetic field applied to the four magneto-optical material columns is along the axis of the magneto-optical material columns.

Same third dielectric material columns 03 are respectively introduced into four lattices (6, 4), (8, 6), (6, 8) and (4, 6) in the photonic crystal, namely into lattices secondly adjacent to the second dielectric material column 02. Silicon material is selected as the material for the third dielectric material columns 03, and the refractive index of the material is 3.4.

The "cross-shaped" photonic crystal magneto-optical circulator comprises four ports, namely a first port 21, a second port 22, a third port 23 and a fourth port 24.

Figure 11:
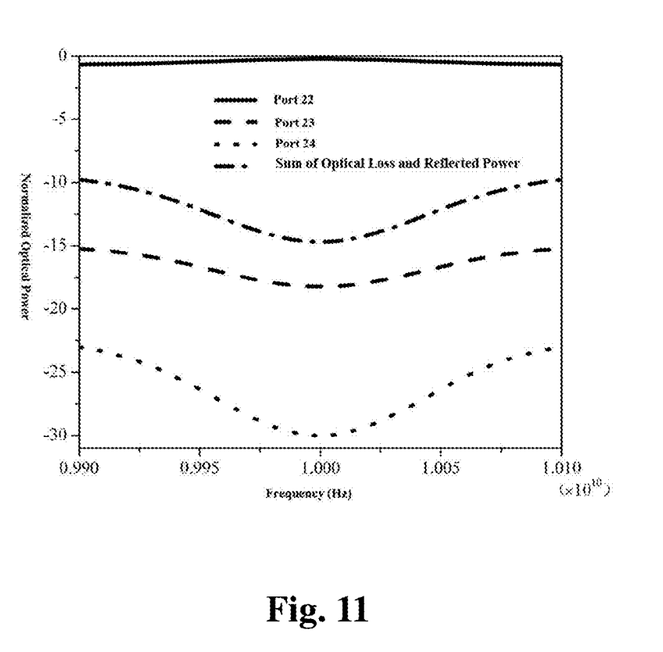
FIG. 11 is a spectrogram of the "cross-shaped" photonic crystal magneto-optical circulator provided by the invention, wherein the port 21 is a light input port; the solid line represents the ratio of the light power at the port 22 to that at the port 21; the dashed line represents the ratio of the light power at the port 23 to that at the port 21; the dot line represents the ratio of the light power at the port 24 to that at the port 21; and the pecked line represents the ratio of the sum of optical loss and reflected light power to the incident light power at the port 21.

Furthermore, the structure parameters of the "cross-shaped" photonic crystal magneto-optical circulator are optimized: light is incident from the first port 21; light detectors are respectively arranged on the second port 22, the third port 23 and the fourth port 24 to obtain the light power transmitted to the corresponding ports; and a light detector is arranged on the first port 21 to obtain the light power reflected back at the port. Moreover, the spectrogram of the "cross-shaped" photonic crystal magneto-optical circulator under the optimum work efficiency, obtained by optimizing the radii of the second dielectric material column 02, the magneto-optical material columns and the third dielectric material columns 03, is illustrated in FIG. 11. In FIG. 11, the solid line, the dashed line and the dot line respectively represent the ratio of the light power at the second port 22 to that at the first port 21, the ratio of the light power at the third port 23 to that at the first port 21, and the ratio of the light power at the fourth port 24 to that at the first port 21 at different frequencies, and the pecked line represents the ratio of the sum of optical loss and reflected light power to the power of the incident light at the first port 21. As illustrated in FIG. 11, the optimum work efficiency of the "cross-shaped" photonic crystal magneto-optical circulator is 10 GHz (operating wavelength λ=30 mm), the ratio of the light power at the second port 22 to that at the first port 21, the ratio of the light power at the third port 23 to that at the first port 21, and the ratio of the light power at the fourth port 24 to that at the first port 21 are −0.223 dB, −18.2 dB and −30 dB respectively; and the ratio of the sum of optical loss and reflected light power to the power of the incident light at the first port 21 is −14.7 dB. Accordingly, the optimized radius $r_2$ of the second dielectric material column 02, the optimized radius $r_m$ of the magneto-optical material columns, and the optimized radius $r_3$ of the third dielectric material columns 03 are $r_2/\lambda=0.125$, $r_m/\lambda=0.09$ and $r_3/\lambda=0.02$ respectively. Due to the rotational symmetry of the structure of the "cross-shaped" photonic crystal magneto-optical circulator, the optimized structure parameters are also applicable to the cases of light incidence from the second port 22, the third port 23 or the fourth port 24.

The working performances of the "cross-shaped" photonic crystal magneto-optical circulator are checked according to the above optimized results.

Figure 12:
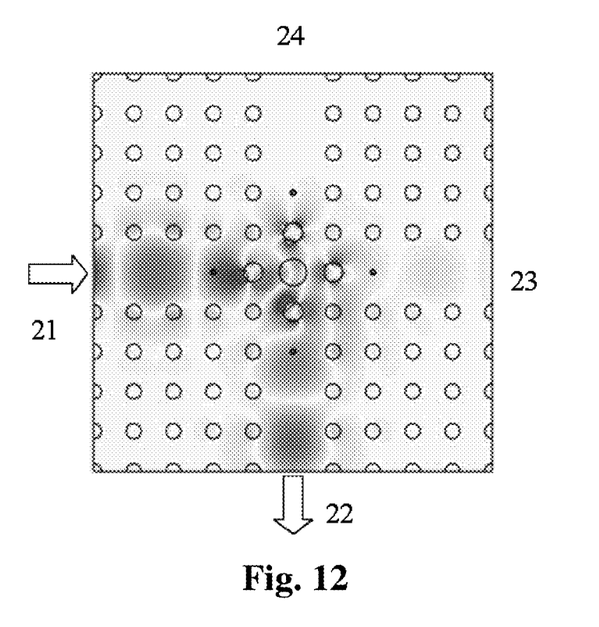
FIG. 12 is a light transmission diagram of the "cross-shaped" photonic crystal magneto-optical circulator provided by the invention, wherein the port 21 is a light input port; the port 22 is a light output port; and the port 23 and the port 24 are light isolating ports.

As illustrated in FIG. 12, light with the frequency of 10 GHz is incident from the first port 21 and finally transmitted to the second port 22 after 90 DEG rotation; the ratio of the light power at the second port 22 to that at the first port 21 is −0.223 dB, the light is rotated by 45 DEG by each of the two magneto-optical material columns E and F at lattices (6, 5) and (7, 6) in the photonic crystal; the third port 23 and the fourth port 24 are in the light isolation state, and the ratio of the light power at the third port 23 to that at the first port 21 and the ratio of the light power at the fourth port 24 to that at the first port 21 are −18.2 dB and −30 dB, respectively; and accordingly, the ratio of the sum of optical loss and reflected light power to the power of the incident light at the first port 21 is −14.7 dB.

Figure 13:
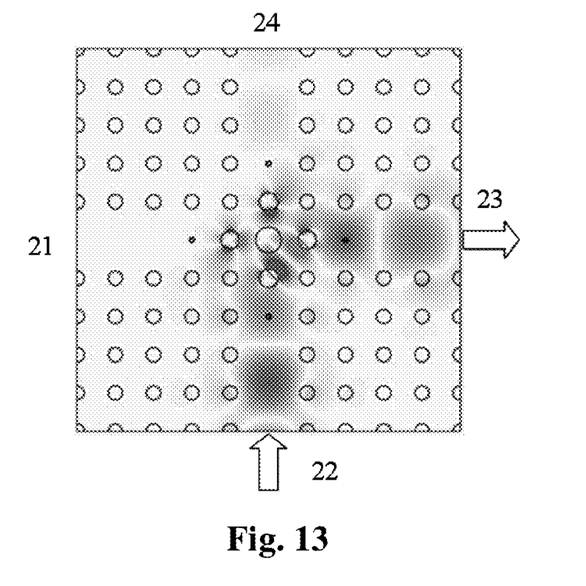
FIG. 13 is a light transmission diagram of the "cross-shaped" photonic crystal magneto-optical circulator provided by the invention, wherein the port 22 is a light input port; the port 23 is a light output port; and the port 21 and the port 24 are light isolating ports.

As illustrated in FIG. 13, light with the frequency of 10 GHz is incident from the second port 22 and finally transmitted to the third port 23 after 90 DEG rotation; the ratio of the light power at the third port 23 to that at the second port 22 is −0.223 dB, the light is rotated by 45 DEG by each of the two magneto-optical material columns F and G in lattices (7, 6) and (6, 7) in the photonic crystal respectively; the fourth port 24 and the first port 21 are in the light isolation state, and the ratio of the light power at the fourth port 24 to that at the second port 22 and the ratio of the light power at the first port 21 to that at the second port 22 are −18.2 dB and −30 dB, respectively; and accordingly, the ratio of the sum of optical loss and reflected light power to the power of the incident light at the second port 22 is −14.7 dB.

Figure 14:
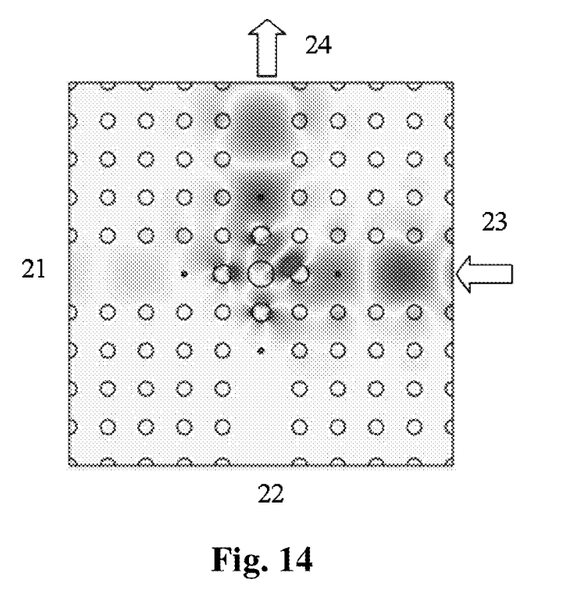
FIG. 14 is a light transmission diagram of the "cross-shaped" photonic crystal magneto-optical circulator provided by the invention, wherein the port 23 is a light input port; the port 24 is a light output port; and the port 21 and the port 22 are light isolating ports.

As illustrated in FIG. 14, light with the frequency of 10 GHz is incident from the third port 23 and finally transmitted to the fourth port 24 after 90 DEG rotation; the ratio of the light power at the fourth port 24 to that at the third port 23 is −0.223 dB, the light is rotated by 45 DEG by each of the two magneto-optical material columns G and H in lattices (6, 7) and (5, 6) in the photonic crystal respectively; the first port 21 and the second port 22 are in the light isolation state, and the ratio of the light power at the first port 21 to that at the third port 23 and the ratio of the light power at the second port 22 to that at the third port 23 are −18.2 dB and −30 dB, respectively; and accordingly, the ratio of the sum of optical loss and reflected light power to the power of the incident light at the third port 23 is −14.7 dB.

Figure 15:
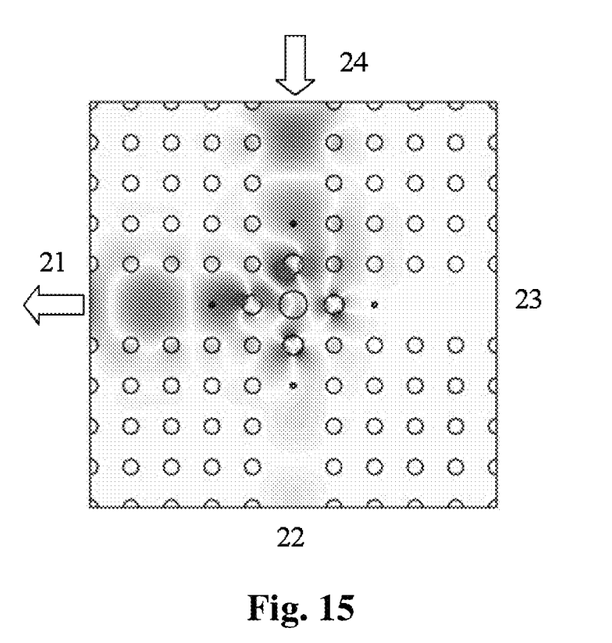
FIG. 15 is a light transmission diagram of the "cross-shaped" photonic crystal magneto-optical circulator provided by the invention, wherein the port 24 is a light input port; the port 21 is a light output port; and the port 22 and the port 23 are light isolating ports.

As illustrated in FIG. 15, light with the frequency of 10 GHz is incident from the fourth port 24 and finally transmitted to the first port 21 after 90 DEG rotation; the ratio of the light power at the first port 21 to that at the fourth port 24 is −0.223 dB, the light is rotated by 45 DEG by each of the two magneto-optical material columns H and E in lattices (5, 6) and (6, 5) in the photonic crystal respectively; the second port 22 and the third port 23 are in the light isolation state, and the ratio of the light power at the second port 22 to that at the fourth port 24 and the ratio of the light power at the third port 23 to that at the fourth port 24 are −18.2 dB and −30 dB respectively; and accordingly, the ratio of the sum of optical loss and reflected light power to the power of the incident light at the fourth port 24 is −14.7 dB.

The "cross-shaped" photonic crystal magneto-optical circulator realizes circular light transmission in single rotational direction among four ports, namely light inputted from any port among the four ports can transmit to the next adjacent port circularly along the same rotational direction.

The photonic crystal three-port circulator of the invention is not limited to the above implementations. It shall be understood by those skilled in the art that the photonic crystal magneto-optical circulator is applicable to any electromagnetic wave band such as the microwave band, the millimeter wave band, the terahertz wave band, the infrared wave band and the visible light wave band according to the technical proposal disclosed by the invention and according to the proportional scaling principle of the photonic crystal, namely the operating wavelength of the circulator is in proportional relationship with the parameters such as the lattice constant of the photonic crystal, the dimensions of the first dielectric material columns, the second dielectric material column and the third dielectric material columns in the photonic crystal, and the dimension of the magneto-optical material columns.

The invention has the advnatages that: firstly, the photonic crystal magneto-optical circulators with the air-substrate-dielectric-column structure (square lattice arrangement) can be effectively matched and integrated with the currently widely investigated photonic crystal logic elements; secondly, the three-port or four-port photonic crystal magneto-optical circulator having simple form and compact structure is obtained by utilizing the structural coupling among the magneto-optical material columns, so as to fully providing circulators with different functions and structures for the optimization of photonic crystal optical logic integrated circuits.

The circulator has the characteristics of simple form and compact structure, can be matched with the currently widely investigated air-substrate-dielectric-column photonic crystal logic elements, can be used as an anti-interference component in a complex photonic crystal optical integrated circuit, and effectively achieve the aims of stabilizing the optical circuit transmission and improving the integration of the optical system.

The above is only the preferred embodiments of the invention and is not intended to limit the invention. Various modifications, equivalent replacements, improvements, etc. made within the spirit and the principle of the invention shall be included within the scope of protection of the invention.

What is claimed is:

1. A photonic crystal magneto-optical circulator comprising first dielectric material columns in an air background, wherein,
said first dielectric material Pateros amounts but in said photonic crystal are arranged in the form of two-dimensional square lattices;
each said first dielectric material column occupies one of said square lattices;
the center-to-center distance between any two adjacent horizontal or vertical said first dielectric material columns is one lattice constant;
and the photonic crystal magneto-optical circulator also comprising
a "T-shaped" or a "cross-shaped" photonic crystal waveguide comprising a horizontal photonic crystal waveguide and a vertical photonic crystal waveguide which are mutually cross-connected;
a second dielectric material column arranged at a cross-connected position of said horizontal photonic crystal waveguide and said vertical photonic crystal waveguide and having the function of light guiding;
four same magneto-optical material columns uniformly arranged on the periphery of said second dielectric material column; and at least three same third dielectric material columns respectively arranged on the outsides of three said magneto-optical material columns.

2. The photonic crystal magneto-optical circulator according to claim 1, wherein said horizontal photonic crystal waveguide and said vertical photonic crystal waveguide which are mutually cross-connected are combined into a "T-shaped" photonic crystal waveguide;
said "T-shaped" photonic crystal waveguide comprises three ports;
said third dielectric material column which is arranged at the outside of each said magneto-optical material column and is arranged in the axial direction of each port respectively; and
an air-point-defect cavity is arranged at the outside of a fourth said magneto-optical material column.

3. The photonic crystal magneto-optical circulator according to claim 1, wherein said horizontal photonic crystal waveguide and said vertical photonic crystal waveguide which are mutually cross-connected are combined into a "cross-shaped" photonic crystal waveguide;
said "cross-shaped" photonic crystal waveguide comprises four ports; and
one said third dielectric material column is arranged at the outside of each said magneto-optical material column and is arranged in the axial direction of each port respectively.

4. The photonic crystal magneto-optical circulator according to claim 1, wherein said first dielectric material columns, said second dielectric material column and said third dielectric material columns are all made of silicon materials which have a refractive index of 3.4; and
said first dielectric material columns, said second dielectric material column and said third dielectric material columns are different in radius.

5. The photonic crystal magneto-optical circulator according to claim 2, wherein said horizontal photonic crystal waveguide and said vertical photonic crystal waveguide are respectively formed by removing a row of said first dielectric material columns and a column of said first dielectric material columns respectively from said photonic crystal;
the length of said horizontal photonic crystal waveguide of said "T-shaped" photonic crystal waveguide is na; and
the length of said vertical photonic crystal waveguide of said "T-shaped" photonic crystal waveguide is (n−1)a/2, wherein "a" represents said lattice constant of said photonic crystal and "n" is 9, 11, 13 or 15.

6. The photonic crystal magneto-optical circulator according to claim 3, wherein said horizontal photonic crystal waveguide and said vertical photonic crystal waveguide are respectively formed by removing a row of said first dielectric material columns and a column of said first dielectric material columns respectively from said photonic crystal; and
the lengths of both said horizontal photonic crystal waveguide and said vertical photonic crystal waveguide of said "cross-shaped" photonic crystal waveguide are na, wherein "a" represents said lattice constant of said photonic crystal and "n" is 9, 11, 13 or 15.

7. The photonic crystal magneto-optical circulator according to claim 1, wherein four said magneto-optical material columns are distributed at four lattices most adjacent to said second dielectric material column; and
the center-to-center distance between each said magneto-optical material column and said second dielectric material column is one lattice constant.

8. The photonic crystal magneto-optical circulator according to claim 2, wherein said air-point-defect cavity is formed by removing one said first dielectric material column at a secondly adjacent lattice above said second dielectric material column.

9. The photonic crystal magneto-optical circulator according to claim 2, wherein three said third dielectric material columns are distributed at three secondly adjacent lattices on the left side, the lower side and the right side of said second dielectric material column; and the center-to-center distance between each said third dielectric material column and said second dielectric material column is two lattice constants.

10. The photonic crystal magneto-optical circulator according to claim 3, wherein four said third dielectric material columns are distributed at the four lattices around said second dielectric material column; and the center-to-center distance between each said third dielectric material column and said second dielectric material column is two lattice constant.

11. A method for manufacturing a photonic crystal magneto-optical circulator, wherein the manufacturing method comprises the following steps:
(1) the operating wavelength $\lambda$ of said photonic crystal magneto-optical circulator is given;
said first dielectric material columns arranged two-dimensionally in the form of square lattice are selected to form a photonic crystal; and
the radius of said first dielectric material columns is selected to guarantee that the operating wavelength is within the forbidden band range of said photonic crystal;
(2) said horizontal photonic crystal waveguide and said vertical photonic crystal waveguide are respectively formed by removing a row of said first dielectric material columns and a column of said first dielectric material columns and are in a cross-connected arrangement;
said second dielectric material column is introduced into a cross-connected position of said horizontal photonic crystal waveguide and said vertical photonic crystal waveguide of said photonic crystal waveguide to form a light guiding column;
same said magneto-optical material columns are respectively introduced into three most adjacent lattices on the left, the lower side and the right of said second dielectric material column;
a most adjacent said first dielectric material column above said second dielectric material column is removed; and
one magneto-optical material column which is the same with said three magneto-optical material columns is introduced thereon.

12. The method for manufacturing the photonic crystal magneto-optical circulator according to claim 11, wherein the manufacturing method further comprises step three:
an air-point-defect cavity is formed by removing one said first dielectric material column at a secondly adjacent lattice above said second dielectric material column; and
same said third dielectric material columns are respectively introduced into three secondly adjacent lattices on the left, the lower side and the right of said second dielectric material column.

13. The method for manufacturing the photonic crystal magneto-optical circulator according to claim 11, wherein the manufacturing method also comprises the following step: same said third dielectric material columns are respectively introduced into four secondly adjacent lattices on the left side, the lower side, the right side and the upper side of said second dielectric material column.

14. The method for manufacturing the photonic crystal magneto-optical circulator according to claim 11, wherein the ratio of the radius of said first dielectric material columns to the operating wavelength is $r_1/\lambda=0.07$.

15. The method for manufacturing the photonic crystal magneto-optical circulator according to claim 12, wherein the work efficiency of said magneto-optical circulator under the operating wavelength $\lambda$ is adjusted by changing the radius $r_2$ of said second dielectric material column, the radius $r_m$ of said magneto-optical material columns and the radius $r_3$ of said third dielectric material columns;

and the dimension parameters under the work efficiency are as follows: the ratios of the radius of said second dielectric material column, the radius of said magneto-optical material columns and the radius of said third dielectric material columns to the operating wavelength are $r_2/\lambda=0.125$, $r_m/\lambda=0.09$ and $r_3/\lambda=0.02$, respectively.

16. The method for manufacturing the photonic crystal magneto-optical circulator according to claim 13, wherein the work efficiency of said magneto-optical circulator under the operating wavelength $\lambda$ is adjusted by changing the radius $r_2$ of said second dielectric material column, the radius $r_m$ of said magneto-optical material columns and the radius $r_3$ of said third dielectric material columns;

and the dimension parameters under the work efficiency are as follows: the ratios of the radius of said second dielectric material column, the radius of said magneto-optical material columns and the radius of said third dielectric material columns to the operating wavelength are $r_2/\lambda=0.125$, $r_m/\lambda=0.09$ and $r_3/\lambda=0.02$, respectively.

* * * * *